(12) United States Patent
Ramamoorthy et al.

(10) Patent No.: US 8,320,446 B2
(45) Date of Patent: Nov. 27, 2012

(54) SYSTEM FOR TRANSMISSION OF SYNCHRONOUS VIDEO WITH COMPRESSION THROUGH CHANNELS WITH VARYING TRANSMISSION DELAY

(75) Inventors: Victor Ramamoorthy, Pleasanton, CA (US); B. Anil Kumar, Saratoga, CA (US); Paul Lessard, Palo Alto, CA (US)

(73) Assignee: QformX, Inc., Pleasanton, CA (US)

( * ) Notice: Subject to any disclaimer, the term of this patent is extended or adjusted under 35 U.S.C. 154(b) by 1666 days.

(21) Appl. No.: 11/286,256

(22) Filed: Nov. 23, 2005

(65) Prior Publication Data

US 2006/0143335 A1    Jun. 29, 2006

Related U.S. Application Data

(60) Provisional application No. 60/630,856, filed on Nov. 24, 2004.

(51) Int. Cl.
*H04N 7/12* (2006.01)

(52) U.S. Cl. ......... 375/240.01; 375/240.02; 375/240.25; 375/240.26

(58) Field of Classification Search ............. 375/240.01, 375/240.02, 240.25, 240.26
See application file for complete search history.

(56) References Cited

U.S. PATENT DOCUMENTS

| 5,574,787 | A | * | 11/1996 | Ryan | 380/201 |
| 5,714,849 | A | * | 2/1998 | Lee | 315/408 |
| 5,805,821 | A | | 9/1998 | Saxena et al. | |
| 5,923,655 | A | | 7/1999 | Veschi et al. | |
| 2003/0112758 | A1 | | 6/2003 | Pang et al. | |
| 2004/0208158 | A1 | | 10/2004 | Fellman et al. | |

* cited by examiner

*Primary Examiner* — Sath V Perungavoor
*Assistant Examiner* — Geepy Pe
(74) *Attorney, Agent, or Firm* — Pillsbury Winthrop Shaw Pittman LLP

(57) ABSTRACT

The present invention overcomes limitations of conventional synchronous signal transmission systems. The present invention provides apparent low latency synchronous signal transmission between devices, even if the transmission channel has impairments, and, allows for asynchronous transmission of signals between a transmitters and receivers that are located between the devices. Compression is preferably used for reducing the bandwidth of the transmitted data which results in asynchronous transmission of signals between a transmitter and a receiver.

27 Claims, 10 Drawing Sheets

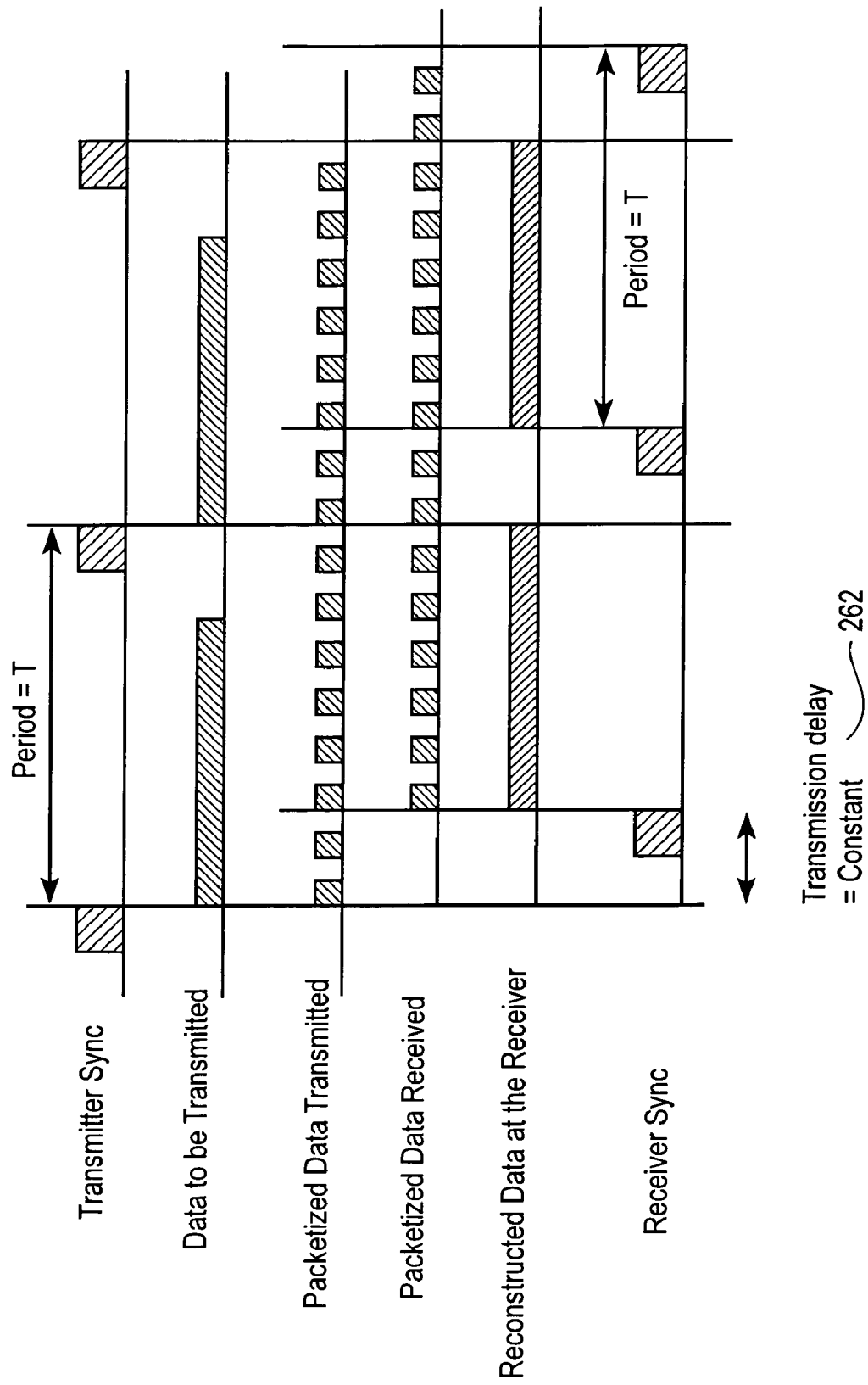

SYSTEM FOR TRANSMISSION OF SYNCHRONOUS VIDEO WITH COMPRESSION THROUGH CHANNELS WITH VARYING TRANSMISSION DELAY

CLAIM OF PRIORITY

This application claims the benefit of priority to U.S. Provisional Application Ser. No. 60/630,856 filed Nov. 24, 2004, which is incorporated herein by reference in its entirety.

BACKGROUND

1. Field of the Invention

The present invention is directed to methods and systems for the transmission of synchronous video with compression.

2. Background of the Related Art

FIG. 1(A) shows the major components of modern computer systems, the computer 100 and display 102A. In the left is the computer 100 which includes motherboard, CPU, power supply, CD ROM/DVD ROM drives, RAM, and other components (not shown). Various different connections with the computer 100 are known, such as connection of a display 102A. One of the more recent such connections is the DVI system, in which a DVI cable, along with associated interface hardware and software in the computer 100 and display 102A, allows the display bandwidth of up to 3+ gigabits/sec of data when transmitted from the computer 100 to the display 102A.

As integration of technologies mature, it is possible to manufacture LCD panels with very large number of pixels so that a high-resolution display capable of displaying multi-million pixels can be obtained at an affordable price. Also camera sensors 102B are available today with multi-millions of pixels for high quality capture of a scene. Accordingly, it is desired to acquire and display very high quality video and images. In order to acquire or display such video and images, however, it is necessary to transmit them from the computer 100 to the display 102A or from the sensor 102B (collectively devices 102) to the computer 100. However, due to bandwidth limitations imposed by known interconnect standards, such as DVI, today, resolution is limited to about 2 mega pixels, whether data is required to be sent to (such as from a sensor) or from (such as to a display) the computer 100.

When transmitting video and image data, it is not only necessary to ensure that all of the data associated with each image is transmitted sufficiently fast, but control data that allows for the correct reproduction to occur must also be included. An example of such control data is vertical and horizontal sizes of the image and their corresponding synchronization signals.

Further, cables connecting between devices 102 to/from the computer 100 are relatively short, typically about 6 feet in length with the existing technology.

A new method, and apparatus associated therewith, of interconnecting between displays and the computer to which they are connected is needed. The present invention, in one aspect, increases this distance for aesthetic, organizational and ergonomic reasons. The present invention in another aspect removes the cable restrictions altogether by using wireless technologies in the place of the existing short thick cables.

SUMMARY OF THE INVENTION

The present invention overcomes limitations of conventional synchronous signal transmission systems.

The present invention provides apparent low latency synchronous signal transmission between devices, even if the transmission channel has impairments, and, allows for asynchronous transmission of signals between a transmitters and receivers that are located between the devices. Compression is preferably used for reducing the bandwidth of the transmitted data which results in asynchronous transmission of signals between a transmitter and a receiver.

The present invention implements this system using a variety of transmission protocols, including, for example, the current DVI and HDMI protocols, twisted pair (CAT 5), power line wiring, and wireless channels such as WiFi and UltraWideBand (UWB).

A preferred embodiment of the present invention is directed to computer-display interconnections or Television—tuner and DVD player interconnections, though the present invention is not restricted to this applications, but is equally applicable to any synchronous data transmission situation through restricted transmission channels.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

Figure 1A:
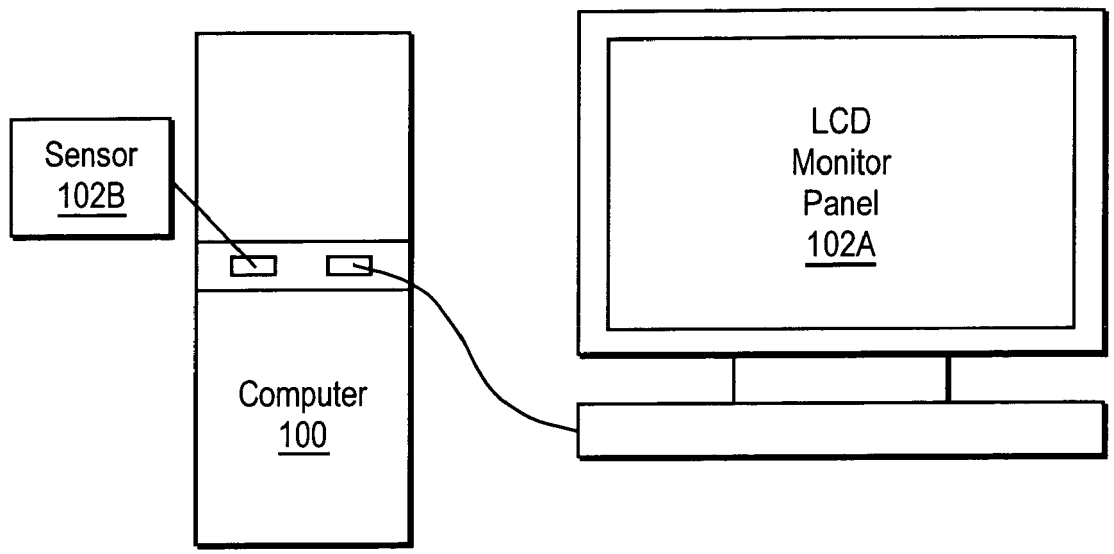
FIG. 1(A) illustrates components of a modern computer system in which one embodiment of the present invention is implemented.

The preferred embodiments of the present invention will be discussed in detail with reference to a transmission system in which synchronous data that includes control signals therein is transmitted from a computer to a display, such as illustrated in FIG. 1(A). It will be understood from this discussion, however, that this system can be adapted for transmission of signals between different devices, such as a sensor to a computer, between data devices, or the like.

One aspect of the present invention is to introduce compression within the synchronous transmission system, such that compressed data is transmitted, and is then decompressed prior to being re-synchronized. The features of the present invention discussed herein are compression independent, and, as such a particular compression/decompression algorithm is not discussed.

Another aspect of the present invention, as described hereinafter, the transmitted data should arrive at the receiver on a frame-to-frame basis synchronously. However the transmission through wireless or wired network introduces unavoidable delays. In addition, the compression engine described herein adds variability in the size of the compressed data that can be random and unpredictable. The net effect is that the transmission turns out to be asynchronous in contrast to the conventional video systems. As such if certain conditions are fulfilled in terms of the relationship between the frame periods and mean of sum of delays due to compression and channel latencies, the reconstructed video signal will be synchronous in the sense that frame-to-frame synchronicity will be maintained almost all the time. In some instances, there will infrequent frame drops because of data not arriving at the receiver in time, which will be dealt with as described hereinafter, and can be dealt with by either replace the dropped frame with another one or reconstructing the dropped frame with parts of available data or correcting the errors with sophisticated error-recovery techniques.

A further aspect of the present invention is that that the video synchronization parameters are not embedded in the transmitted compressed data stream such as synchronization time stamps. Hence conventional way of clock extraction from data is not employed in the system described herein.

With the above in mind, a background of synchronous transmission is provided, to assist with understanding of the preferred embodiments described thereafter.

Figure 1B:
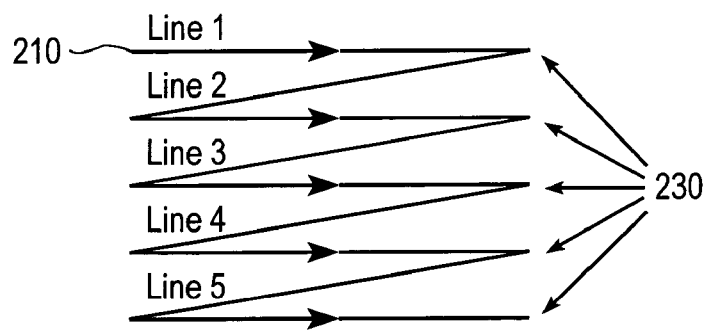
FIGS. 1(B) and (C) illustrate sync signal operations of a display.
Figure 1C:
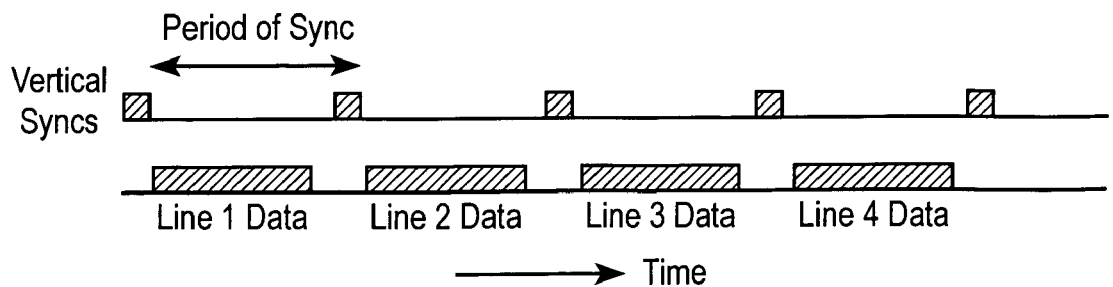

Synchronous Transmission:

If one magnifies the picture displayed on a monitor display 102 such as illustrated in FIG. 1(A), the picture is broken into rows or lines 210 of pixels. Writing the pixel values in a row and retracing back to the beginning of the next row of the display 102. A horizontal sync signal 231 directs this retrace operation, as shown in FIG. 1(B). The video card of the computer 100 (not shown) transmits the data associated with the pixels as shown in FIG. 1(B). The horizontal sync signal 231 indicates the start of each line 210 of pixel data. Since the monitor 102 knows exactly the period of the vertical syncs appearing at the end of each frame, the display 102 "locks" into the syncs and shows the picture flicker-free and steady. In fact, the period of the vertical sync signal and horizontal sync signal 231 is transmitted to the monitor display 102 whenever the type of image being displayed is changed. This means that the data transmission between the video card of the computer 100 and the monitor display 102 is synchronous as demarked by the sync pulse.

Figure 2A:
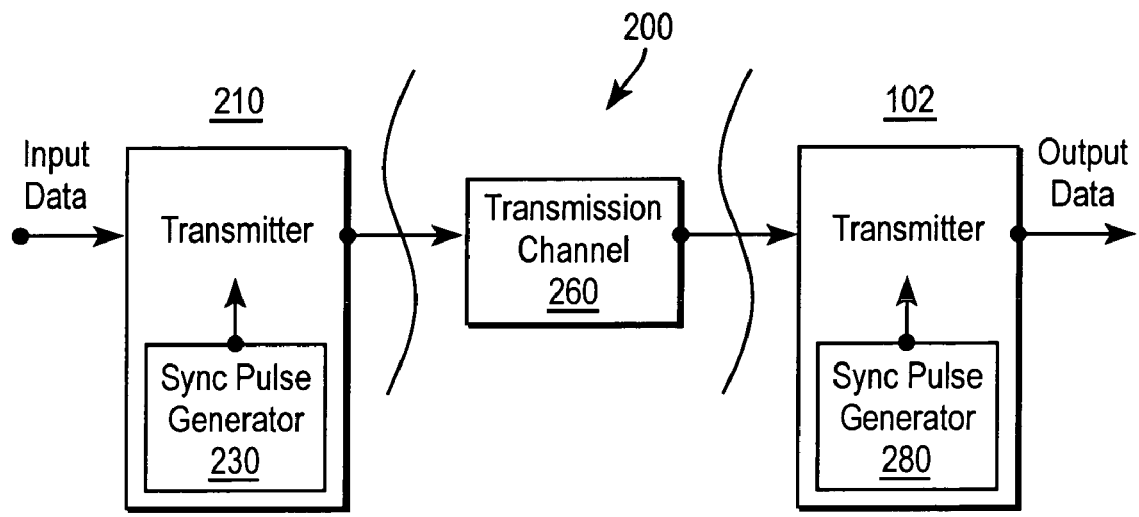
FIG. 2(A) illustrates an overview of a conventional synchronous data transmission system.

Though horizontal and vertical sync pulse are one of the synchronizing control signals, it is useful to extend this concept to a generalized synchronous system 200 shown in FIG. 2(A). From a source 210, the data enters the transmitter 220 and is guided through by a sync pulse generator 230, which can be a combination of many different synchronizing pulses 232. As long as the transmitter 220 and the receiver 270 agree upon the sync period and the definition of sync pulses, synchronous transmission can take place and then the sync pulses and data used by a destination 202. In an example implementation, a DVI cable, as channel 260, acts as the transmission channel. The receiver 270 resides at the destination monitor 202 and outputs the display information as governed by its sync pulse generator 280.

Figure 2B:
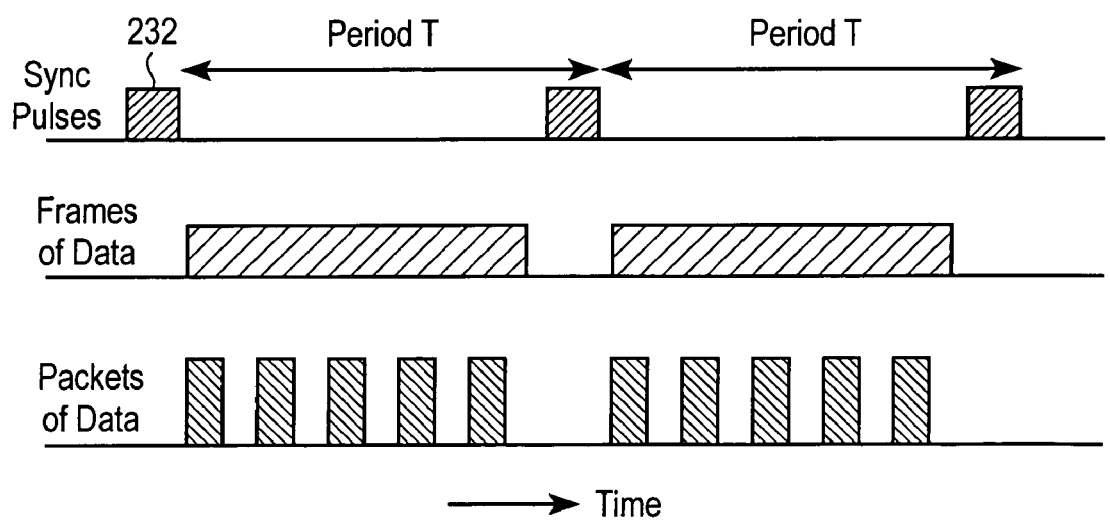
FIGS. 2(B) and (C) illustrate timing diagrams for synchronous data transmission.

The timing diagram in FIG. 2(B) further clarifies the point: now the sync pulses 232 can be markers for a frame of data—a frame can be multiple lines—which is further broken down into packets of data in an arbitrary manner. As long as the transmission takes place within the bounds of the sync pulses 232, the system 200 will be synchronous. If the data is for a display, the display will be steady.

The timing diagram in FIG. 2(c) further introduced the physical world reality of delay that will exist as a result of the channel 260. Components such as these introduce a delay in transporting the data packets from one end of the system 200 to the other. If that delay 262 that is introduced is constant, as shown, the system 200 will work, with the constant delay in the channel only appearing as a constant latency between the transmitter 220 and the receiver 270. For short lengths of a DVI cable, this delay would be in milliseconds and would be hardly perceivable by a human viewer. The timing illustrated in FIG. 2(C) exists today with the conventional DVI interconnect system. The problem, however, is that the bandwidth of the DVI cable or other channels 260 does not permit transmitting higher resolution data to the monitor.

Compression

Figure 3A:
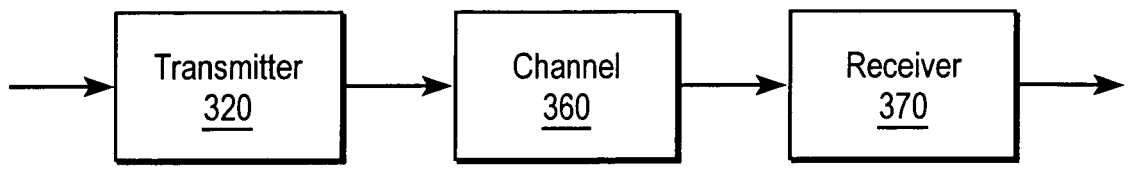
FIG. 3(A) illustrates an overview of a synchronous data transmission system according to a preferred embodiment of the present invention.

The present invention, in order to overcome the bandwidth limitation imposed by conventional systems, introduces compression in the system 300 as depicted in FIG. 3(A). Though many different forms of lossy and lossless transmission exist, and the specific compression scheme chosen will depend upon the particular application being implemented, the framework required in implementing a particular compression technique remains the same whether the compression used is standard JPEG, MPEG, JPEG 2000, or some other compression algorithm. It is nevertheless understood, however, that while implementing the system with compression is preferred, the present invention can be implemented without compression, and other beneficial aspects obtained.

Figure 3B:
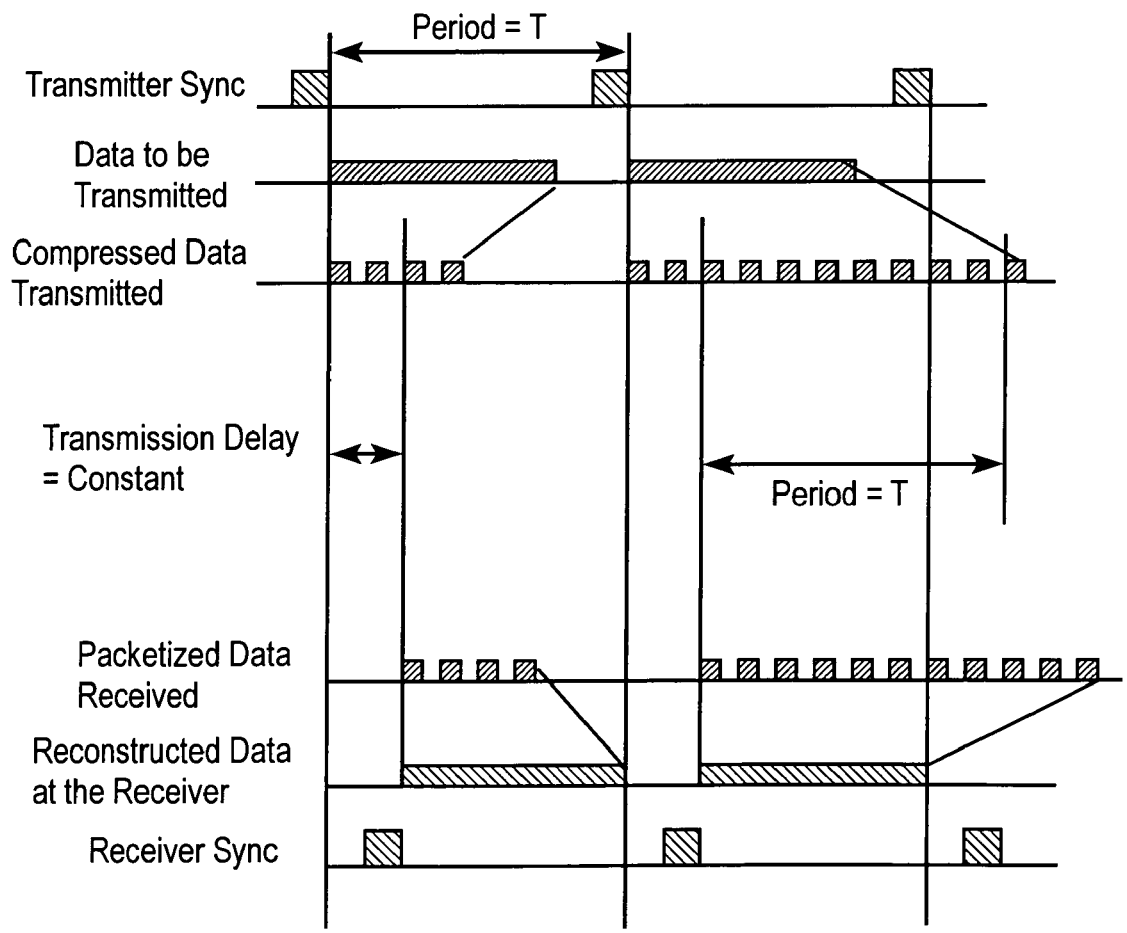
FIGS. 3(B) and (C) illustrate timing diagrams considering compression and latency, respectively of the present invention.

As illustrated in FIG. 3(a), the input data is first input to a transmitter with compression. After transmission through the channel 360, the compressed data is received at a receiver with decompression 370, and displayed on a monitor display. This approach further complicates the data transmission, particularly from a timing and synchronization point of view. As shown in FIG. 3(B), some data frames can be compressed to a large extent while in other data frames the compression can only be little or modest. For compression strategy to work, most of the data frames must be compressed effectively, though it is understood this is not necessarily possible for every data frame. As such, the compression necessarily works in a stochastic framework. This means that a majority of compressed frames can be transmitted quickly within the sync period. There will be instances, however, when the compressed frame will contain more packets than can be sent within the sync period. This aspect of "pseudo-synchronous" behavior can cause the display to flicker and, depending on the needed system specification, can make the system unacceptable unless the design is specifically modified to achieve synchronicity, as will be explained hereinafter.

Figure 3C:
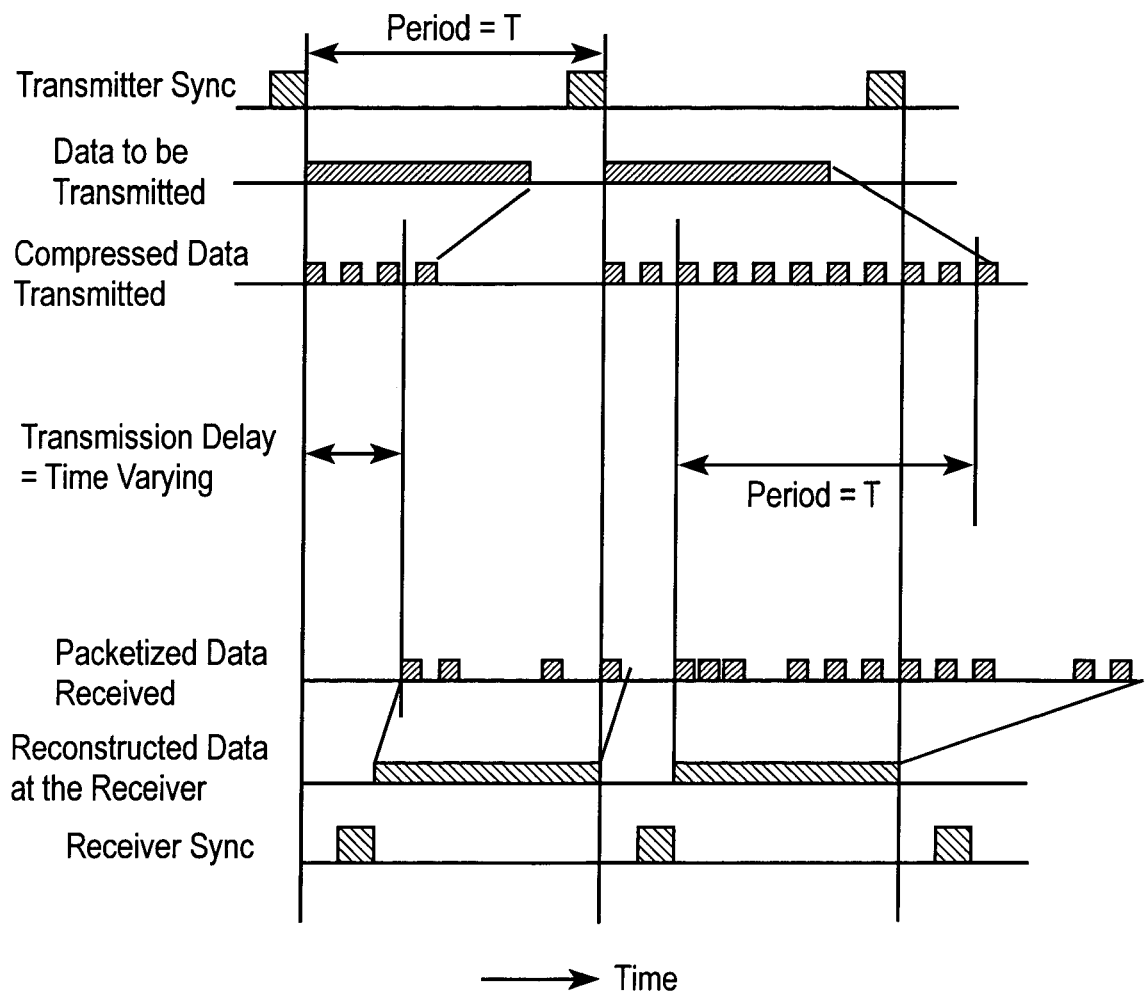

Yet another problem appears when time varying and random delays are exhibited in the transmission channel. Most of wireless channels and twisted pair Ethernet based channels have this tendency. FIG. 3(C) shows the timing relationship between transmitted and received packets, when there is a random delay 362 introduced into the communication channel 360 that is not compensated. Again, the result is loss of strict synchronism between the transmitter 320 and the receiver 370, resulting in display jitter.

Figure 4:
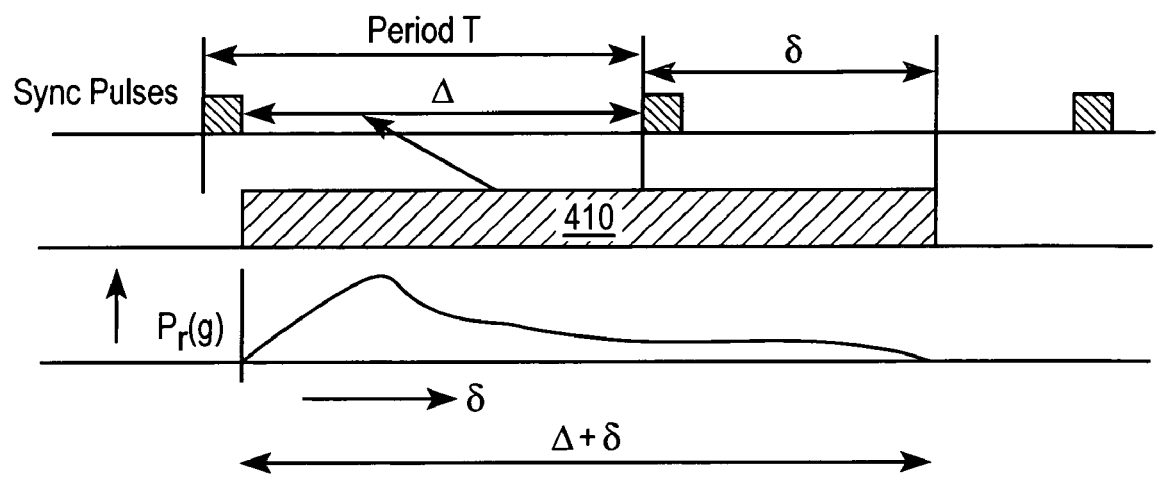
FIG. 4 illustrates a timing model according to a preferred embodiment of the present invention.

The effects of compression and time varying transmission channel are similar in that both tend to distort the arrival of data packets randomly. These two effects can be combined and a model developed to overcome them is illustrated in FIG. 4. This model simply assumes that any data transmitted within a sync period can arrive at the receiver 370 with a random delay given by the uncorrelated stochastic variable $\Gamma_n$ at any time n. Further the realization of the stochastic series $\{\Gamma_n\}$ is given by $\{g_n\}$ where $\Gamma_n$ has an arbitrary distribution over the interval $(0, \Delta+\delta)$ and the probability that $\Gamma_n = g$ is given by the density function $P_\Gamma(g)$. From this definition, it is clear that $P_\Gamma(g) \geqq 0$ and mean value of the series, $$m_\Gamma = \int_0^{\Delta+\delta} g P_\Gamma(g) dg$$

and variance $$\sigma_\Gamma^2 = \int_0^{(\Delta+\delta)} (g - m_\Gamma)^2 P_\Gamma(g) dg.$$

This assumption is clearly indicated in FIG. 4. The interval 410 in the timing diagram marks the arrival time at the receiver 370. The probability distribution is given below this interval. For simplicity, it is assumed that the arrival time distribution is bound by twice the sync period. That is, the receiver arrival time for the nth data frame is $\hat{t}_r(n) = (T-\Delta) + g_n + nT$ with a support from $(T-\Delta)$ and $(T+\delta)$. In other words, $(T-\Delta)$ is the minimum channel propagation delay and $(T+\delta)$ is the maximum value that it can attain.

Figure 5:
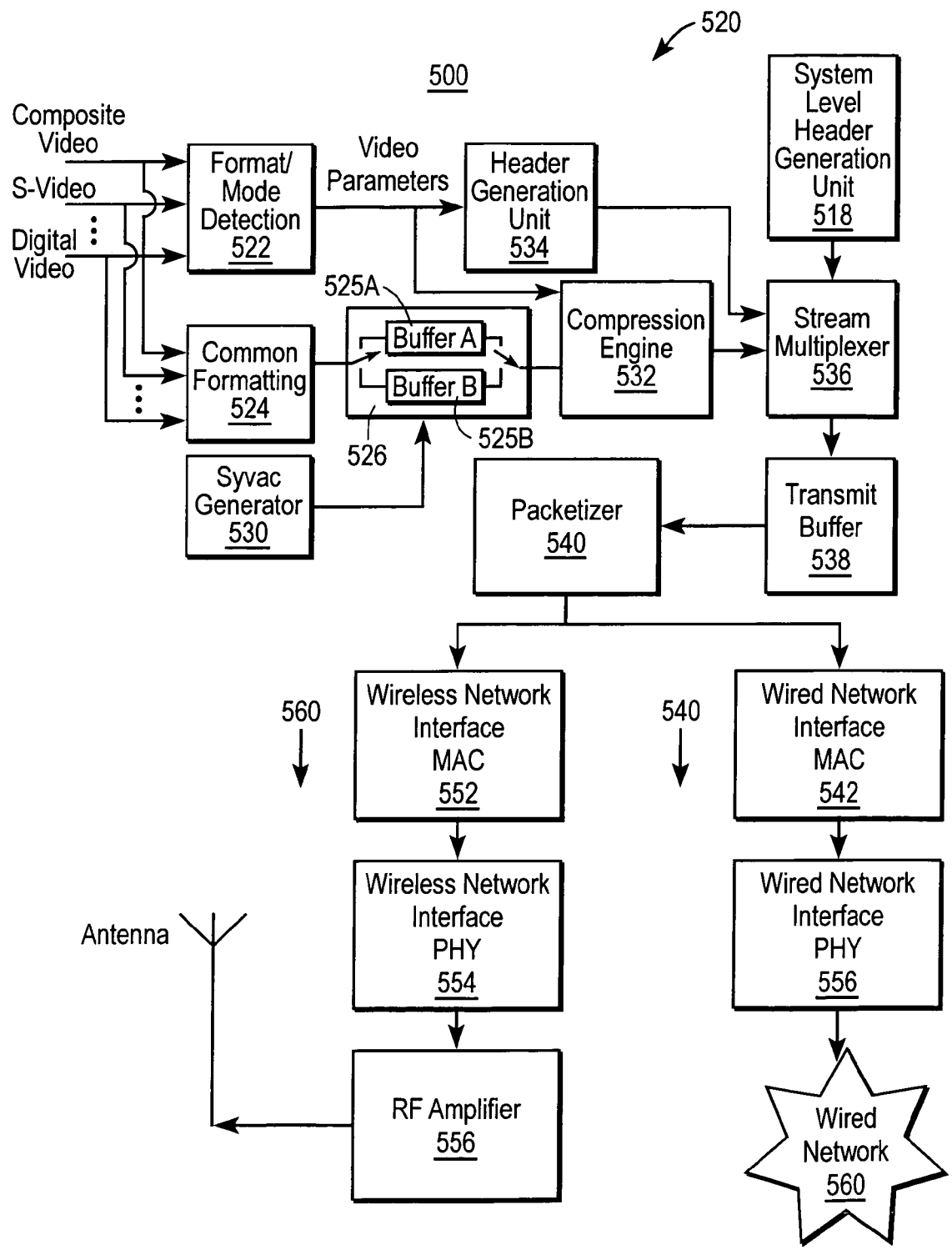
FIG. 5 illustrates a functional block diagram of a transmitter according to a preferred embodiment of the present invention.
Figure 6:
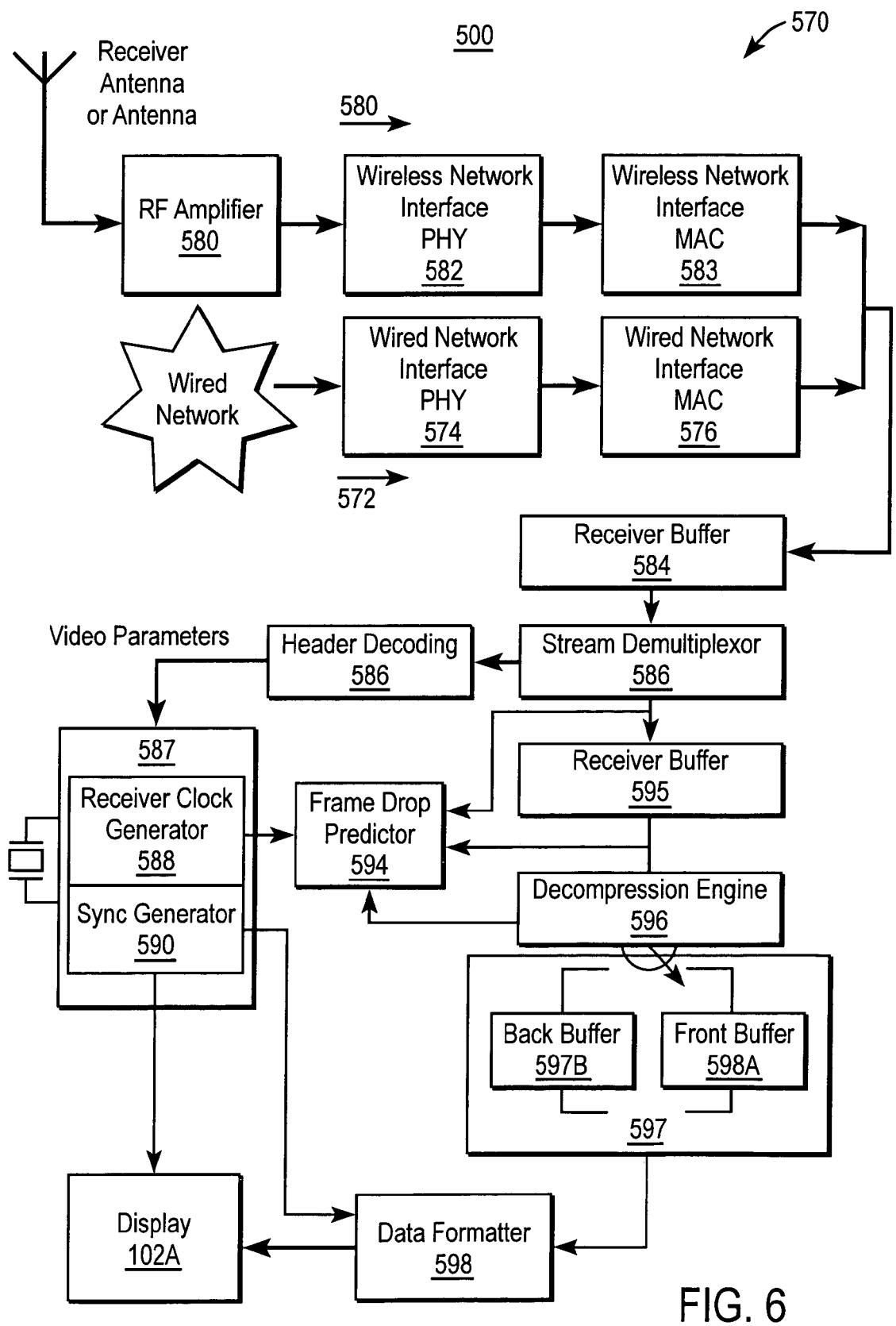
FIG. 6 illustrates a functional block diagram of a receiver according to a preferred embodiment of the present invention.

Based upon this model, a system 500 that includes a transmitter system 520 and a receiver system 570 has been developed to implement it, as illustrated in FIGS. 5 and 6. The input data is first split into two parts, one for input into a data format mode detection unit 522 and the other for a common data formatting unit 524.

In the preferred embodiment, the data format mode detection unit 522 and the common data formatting unit 524 operate upon video data (that may or may not include an audio component), though the present invention can be adapted to operate upon data in other formats. If audio data is used, it will preferably have its own data area, as well as sub-headers, that allow for distribution, identification of the type of audio data, and the type of compression used on the audio data, as described herein with respect to video data.

Figure 8:
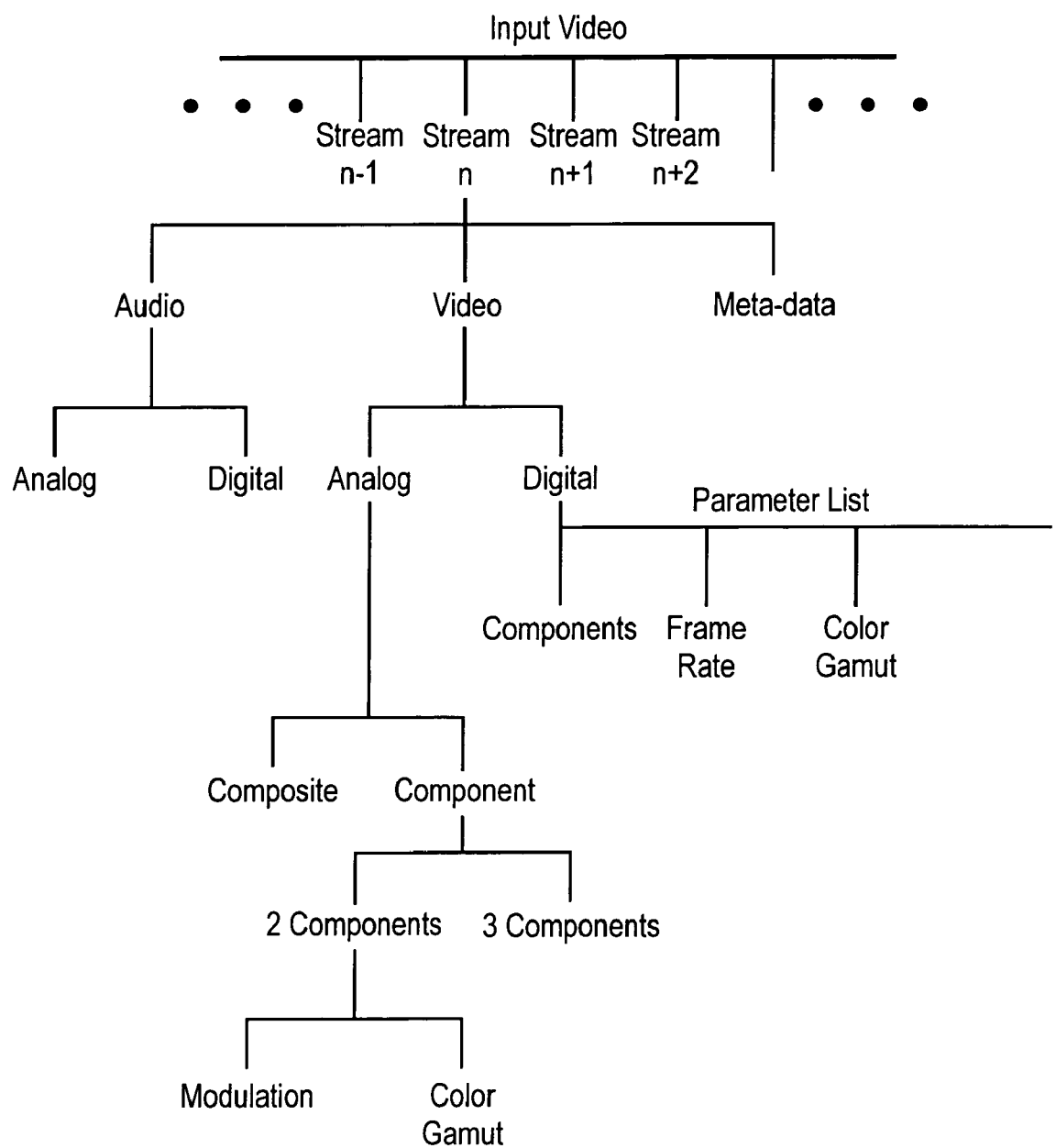
FIG. 8 illustrates a format/mode detection tree according to a preferred embodiment of the present invention.

The data format mode detection unit 522 detects from the incoming synchronous data stream parameters of the data. In order to encode the video parameters, it is preferable to arrange the parameters in a hierarchical manner, as shown in FIG. 8, although other detection schemes can be used. First the transmitted data is divided into many streams. Then each stream is divided into then into 3 sub components, namely audio, video, and associated meta-data. Audio and video can be either analog or digital. In either case, they may carry more than one sub components such as color components, and stereo audio components. These components, in turn, can be classified into either a parameter list or other sub classes. In this way, the input video is categorized and coded as a leaf in a tree. A string of numbers and a string of text characters denote each leaf. The numbers and the strings help in uniquely identifying the input video. There will be some redundancies that will be added in the specification so that the identification can be made even in the case of moderate errors in the transmission system.

The data format mode detection unit 522 detects the particular parameters, such as pixels in x direction, pixels in y direction, frame rate, color space, # bytes to reference signal, and interleaved or non-interleaved data for the input signal of the formal associated with it. Techniques to detect these parameters from a video signal are known to persons of ordinary skill, and are therefore not described further herein.

The common data formatting unit 524 receives the input stream, in one of a predetermined number of acceptable input formats that can be recognized, and formats this input stream into a common data format that is usable by the system 500. In a simple form of the invention, the system 500 has the capability of only operating upon a single type of data format, and there is no common data formatting needed. The aim of the common data formatting is to retain the quality of the input video irrespective of its origin. The input video, if it happens to be a low-resolution format, is up-sampled to a higher resolution. If the input is already in high-resolution format, it is left unchanged. Here low resolution may mean smaller number of pixels as well as low frame rate. By converting any of the input to a common high resolution format, simplification in processing is guaranteed while maintaining highest possible quality.

The common data stream output from the common data formatting unit 524 is buffered in buffer 526, which contains double buffers 526A and 526B. Which buffer is filled, and which is emptied, is controlled by the sync pulse generator 530. While one of the buffers, such as 526A is being filled, the data in buffer 526B is sent to the compression engine 532. Once the data in buffer 526B is exhausted, the buffers are switched, as buffer 526A would now be full.

Compression engine 532 compresses the data using the pre-selected compression algorithm, and. The compression engine 532 consumes fixed size data and generates variable size compressed data, which is then filled into an internal buffer for transmission along with a preferably uncompressed compression header that identifies characteristics of each next batch of compressed data that will be transmitted. The transmitted data may also contain a forward error correction scheme involving parity check bits. Forward error correction is a well-known art and hence details of forward error correction are omitted here. Because of the nature of compression operations generally, the internal buffer needs to have sufficient capacity so that it does not overflows. It has been determined that holding at least a few frames worth of compressed data is sufficient, though, if needed, a buffer manager (not shown) can monitor the buffer level and can control the compression engine 532 either to produce more compressed data or less compressed data depending on the average drainage of the compressed data by the transmitter. In case of severe channel congestion, a feedback mechanism can be part of the buffer manager, and highly compressed data can be generated by the compression engine 532 in order to minimize the load on the channel. These dynamic adjustments are notified to the receiver in the preferably uncompressed compression header that is generated with the compressed data output from the compression engine 532.

Compression removes all the memory structure correlations and makes it appear as a "white noise" signal. If desired, encryption can then be applied to the compressed stream to prevent an unauthorized decoding of the compressed stream, and corresponding decryption module inserted prior to the decompression engine in the receiver.

While compression engine 532 is compressing the data to obtain the compressed data, a header generation unit 534 receives the parameters from the data, and generates a header for each frame that contains information sufficient to allow for reproduction of the frame at the receiver, including the vertical and horizontal sync signals, as well as the compression details, length of the compressed stream, error control schemes and encryption choices used. Header generation unit operates by looking at the results generated by the mode detection system. The mode detection classifies the input according to the hierarchical classification scheme mentioned before. The header generation unit then takes in this information and performs a table lookup operation to generate the header strings, as is known in the art. Once generated, the header for each frame sent to an internal buffer within the header generation unit 532, for transmission that will precede the frame with which it is associated. It is noted that the header information will not preferably be compressed, since having the header information in raw form at the receiver allows for the generation of the control signals in time sufficient to allow for the rendering of the frame with minimal latency, as will be described further hereinafter. Alternatively, it also can be added with checksums using an algebraic encoder or a block encoder to protect the data contained in the header.

In addition to the header generation unit 534, there is also supplied a system level header generation unit 518, the main purpose of which is to provide header information so that the various signals can be transmitted from one transmitter to multiple receivers, and therefore will identify in the system level header the receiver or receivers that are to obtain the corresponding data.

Stream multiplexer 536 multiplexes the header information from the header generation unit 534 the system level header generation unit 518, and the compressed data from the compression engine 532, such that the header information is properly ordered to precede the associated compressed data for each frame, to obtain transmit data. It is noted that one of the primary objectives of the present invention is to transmit the transmit data with as low a latency as possible, and as such, requires that the transmit data be properly ordered at transmission, in contrast to other systems which do not require such a low latency. Transmit buffer 538 receives the properly ordered transmit data (with, as one of ordinary skill in the art will recognize, identifiers included by the header generation unit 534 and the compression engine 532 that allow differentiation between the header and the data from the compression engine at the receiver 570), and places the transmit data in the queue. At the appropriate time, as determined by clock signal from the sync generator, the packetizer 540 receives units of transmit data, and places the transmit data into a packet for transmission.

Two different transmit chains are illustrated, one wired chain 540, and one wireless chain 550. One or both of the transmit chains can be used at the same time, depending upon the setting from the system level header generation unit 518. Wired transmit chain 540 includes a wired network interface media access layer 542 and a wired network interface physical layer 546, which components are conventional, and therefore need not be further described herein. Wireless transmit chain 550 includes a wireless network interface media access layer 552, a wireless network interface physical layer 554, and an RF amplifier 556, which components are also conventional, and therefore need not be further described herein. Both the wired transmit chain 540 and the wireless transmit chain 550 thereby transmit the transmit data onto the appropriate transmit channel 560.

At the receiver 570, the received transmit data will pass through one of the receive chains, either the wired receive chain 572 or the wireless receive chain 580. Wired receive chain 572 includes a wired network interface physical layer 574 and a wired network interface media access layer 576, which components are conventional, and therefore need not be further described herein. Wireless receive chain 580 includes an RF amplifier 581, a wireless network interface physical layer 582, and a wireless network interface media access layer 583, which components are also conventional, and therefore need not be further described herein. Both the wired receive chain 572 and the wireless receive chain 580 thereby send the received data onto a receive buffer and depacketizer 584, which removes any of the packet information, recreates the transmit data, and places the transmit data in an internal buffer for subsequent processing.

The subsequent processing that is initially performed is determining which information is header information, and which information is compressed data, which is performed by stream demultiplexor 585. The header information is passed to header decoding unit 586, and the compressed data is passed to the receive buffer 595.

Header decoding unit 586, for each frame, determines that the received data is properly for the display 102a corresponding to the receiver 570 based upon the system level header, and determines the appropriate manner to process the received data from the header and compression header, and generates parameters that are fed to the clock control circuit 587, which circuit includes a receiver clock generator 588, and a sync generator 590. In essence, the clock control circuit is a controller for particular type of frame that is received, as will be understood by one of ordinary skill in the art, which controller can include, for example and as most typically implemented, both image and audio components to the frame. As such, the clock control circuit will contain different chains, corresponding to different types of frames that allow for the control signals associated with that type of frame to be generated.

A significant aspect of the clock circuit, in certain embodiments, is the manner in which the clock control circuit can operate. In a preferred embodiment, the header information contains the VSYNC timing measurements, a VSYNC marker, and source display resolution. Based on this information, the controller of the clock control circuit, and, more specifically, the pixel clock, can be adjusted at the presentation end.

In order to start the chain of timing signals at the appropriate time, the clock control circuit is forced to sync to an initial marker for the start of a source VSYNC. Since the format of the data and display presentation is known, the remaining syncs after the initial one can be calculated, since they are not transmitted, it can be determined where such syncs need to exist. Furthermore, since the received data is not synchronously received, but the necessary characteristics of the display are known, as is the number and sequence of pixels of received data, the frequency of the pixel clock can be adjusted to ensure that the display data is transmitted to the display device synchronously. This adjustment to the pixel clock can be made by observing the difference, or error, between the point at which a VSYNC is inserted based upon the data flow (i.e. where within the pixels), and the actual VSYNC as needed in order for a correct display. As a result, since the precise amount of pixels per frame has been programmed to match the receiver resolution, taking care of any retrace timing adjustment, and have matched the frequency of the source, the system is in "lock". Thus, for every pixel input to the system, a pixel is output from the system.

Further advantages can be obtained as a result of the manner in the systems operates with respect to the clock control circuit. In particular, in one aspect, the retrace percentage can be changed to compensate for limitations in certain systems, such as display limitations. For example, even though the source end could have a low 5% retrace in the stream the system can be programmed to support a more standard 22% retrace for the destination display, like for a CRT.

In another aspect, since the system maintains a count and thus absolute control over the pixels as they are displayed, the invention can support copy protection pixel value scrambling. This is important because current copy protection schemes don't work well wirelessly due to bit errors—as a single bit error "kills" many pixels. Thus, the present invention can support, for example, an "HDCP" type of copy protection scrambler, where the pixel values are scrambled based on pixel position, regardless of pixel the pixel value. If there is a pixel bit error, only the affected pixel is corrupted, the unaffected pixels are still correctly decoded.

Each compressed frame will then pass from the receive buffer 595 to the decompression engine 596, which decompresses the data corresponding to that frame. The decompressed data is then fed to one of the buffers 597, particularly either the front buffer 597A or back buffer 597B, depending upon which has been currently used, in an alternating fashion similar to that described above with respect to buffer 526. Further, frame drop predictor operates as more fully described below to determine whether the frame will be decompressed in sufficient time for usage, and whether to drop the frame.

The decompressed data, therefore, is queued within one of the front buffer 597A or back buffer 597B, such that the decompressed data can then be output as needed for use by the data formatter 598.

The data formatter 598, using the received data, inserts the appropriate control signals, including vertical and horizontal syncs to the decompressed data, to create a stream for the display device 102 (which can include both image and audio components, using the reconstructed synchronous data signal).

From the above, it is apparent that the receiver 570 can receive transmit data at arbitrary instants, in a manner consistent with the mode of FIG. 4 described above. Since the receiver 570 buffers the received transmit data in receive buffer 584, as well as the compressed data that is predicted as being able to be rendered in time in one of buffers 597, the decompression engine 596 can fill one of the buffers 597A or 597B with the next frame data it is operating upon until it finds the end of a code word corresponding to that data frame. As mentioned above, since most of the time the compressed data tends to be small, but will occasionally exceed the average size, the decompression engine 596 drains the buffer 595 in a random fashion and constructs the decompressed data frame to be sent to one of the buffers 597A or 597B. Given the above, it is necessary to manage the buffer 595 at the receiver 570. Since, however, the input to buffer 595 arrives sporadically and gets also drained sporadically, occasionally buffer 595 is emptied. To accommodate for this situation, to maintain visual integrity, if the frame drop predictor 594 calculates that the next frame will not be decompressed in sufficient time, if a predetermined amount of time (such as one sync period) is "lost" in waiting for further compressed data to arrive at buffer 595, the receiver, the frame drop predictor will predict a loss of data before it happens.

Frame drop predictor 594 operates based using the following algorithm, and assumes that sync period T is exactly known both to the transmitter 520 and receiver 570. In fact, this information is sent in the header, as described above. Hence the time at which nth frame of data sent by the transmitter 520 is $t_r(n)=nT$. Since the sync generators at both ends are set to the period T, the receiver 570 receives its sync pulse for the nth frame at $R_n=nT+S_n$, where $\{S_n\}$ is an uncontrollable zero mean noise sequence to account for the phase difference between the sync clocks at the transmitter and clock drift due to thermal effects in transmitter 520 and the receiver 570. Let $\{R_n\}$ be the instants when the display at the receiver should ideally start its displaying process by consuming the data in the double buffers 597A and 597B. The actual realizations are denoted by $\{r_n\}$ and $\{s_n\}$ respectively for display start instances and the noise respectively. Let $\{W_n\}$ be the actual time instant at which the decompression engine empties its output to one of the two double buffers 597A and 597B.

Figure 7:
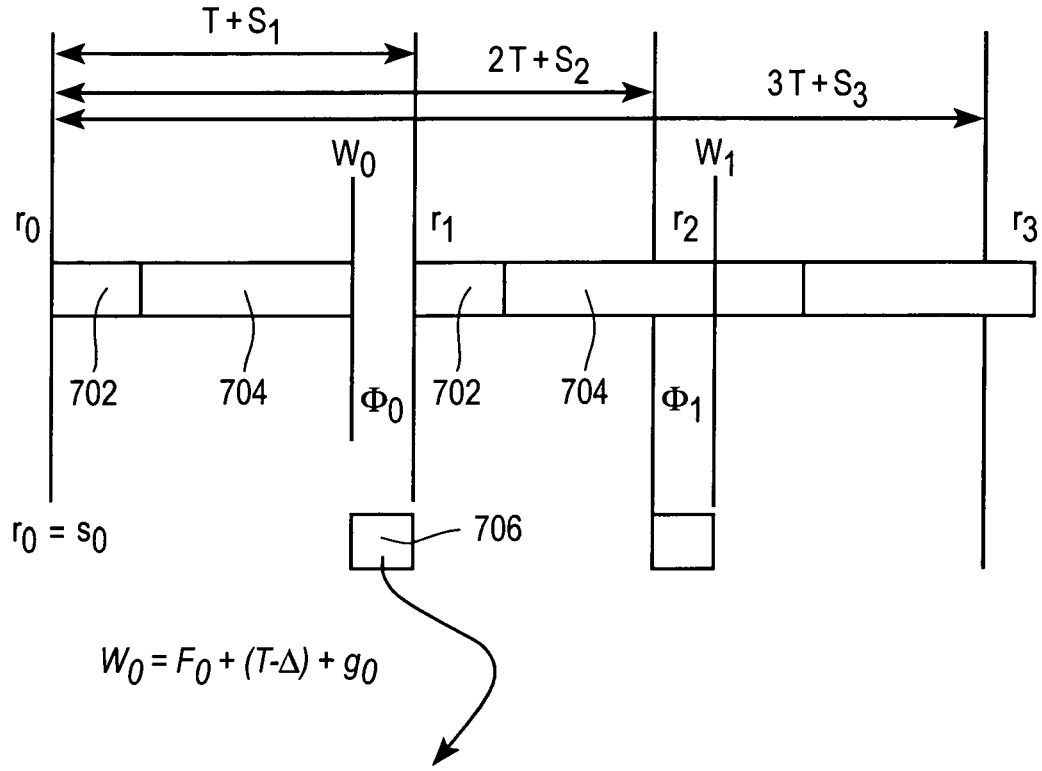
FIG. 7 illustrates a timing diagram according to a preferred embodiment of the present invention.

Assuming that the system is started at time 0, the frame drop predictor 594 will determine if time has been lost in displaying the zero-th frame, as shown in FIG. 7. This "lost" time is denoted by $\phi_0$ for frame 0. Then for the frame 0, the following apply:

$$r_0 = s_0;$$

$w_0 = r_0 + (T-\Delta) + g_0$; The quantity $(T-\Delta)$ is shown as 702. The random delay is shown by 704 in FIG. 7.

$\phi_0 = w_0 - r_1 = w_0 - T - = s_1 = (s_0 - s_1) + g_0 - \Delta$; For this frame, there is no "lost" time as the data arrived and was decoded before the deadline. Hence $\phi_0$ is negative as shown by 706 in FIG. 7.

Similarly for frame 1:

$$w_1 = \begin{cases} r_1 + (T-\Delta) + g_1 = T + s_1 + (T-\Delta) + g_1 & \text{if } \varphi_0 \leq 0 \\ w_0 + (T-\Delta) + g_1 = s_0 + 2(T-\Delta) + g_0 + g_1 & \text{if } \varphi_0 > 0 \end{cases}$$

$$\varphi_1 = (w_1 - r_2) =$$

$$\begin{cases} T + s_1 + (T-\Delta) + g_1 - 2T - s_2 = s_1 - s_2 + g_1 - \Delta & \text{if } \varphi_0 \leq 0 \\ (s_0 - s_2) + g_0 + g_1 - 2\Delta = \varphi_0 + (s_1 - s_2) + (g_1 - \Delta) & \text{if } \varphi_0 > 0 \end{cases}$$

Continuing this way, it is possible to find a general expression for "lost" time at frame n as:

$$\varphi_n = \begin{cases} (s_n - s_{n+1}) + (g_n - \Delta) & \text{if } \varphi_{n-1} \leq 0 \\ \varphi_{n-1} + (s_n - s_{n+1}) + (g_n - \Delta) & \text{if } \varphi_{n-1} > 0 \end{cases}$$

The above recursive relationship is an interesting one. For all positive values, "lost" time behaves as a First Order Auto regressive process with unity correlation coefficient. If a sequence of $(\phi_0, \phi_1, \phi_2, \phi_3, \ldots \phi_n)$ are all non-zero positive numbers, then this situation corresponds to the catastrophic accumulation of "lost" time values such that the final nth frame is bound to be dropped by the receiver system. This can happen only if the following is true:

$$\varphi_n = (s_0 - s_n) + \sum_{i=0}^{n} g_i - (n+1)\Delta = (s_0 - s_n) + (n+1)\left[\frac{1}{(n+1)}\sum_{i=0}^{n} g_i - \Delta\right] > T$$

Considering only the left hand terms in the above equation, we can arrive at the expected value of "lost" time (assuming stochastic convergence) at any instant n as:

$$E((\phi_n)) = (n+1)[m_r - \Delta]$$

If $m_r < \Delta$, the expected value of "lost" time becomes negative, which in turn means that the system is exhibiting Asymptotic Synchronous Locking. This means that even if the system has tendency to have "lost" times, they do not jeopardize the stability of the system; the system has long-term stability and individual "lost" times do not result in frame drops. In other words, the statistics of the decoding fluctuations keep the system under control. Such Stochastic Stability is enforced by the manifestation of Tchebycheff Inequality well known in the field of statistics and random process.

Referring back to FIG. 3(A), the above reasoning results in the condition that the mean value of the channel delay time must be always less than the frame period T to achieve the almost non-frame-dropping operating point. Hence the essential constraint for almost drop-free receiver operation is that the mean value of the channel delay time should be less than the frame period.

A slightly weaker stability exists for the condition, $m_r = \Delta$. The "lost" time value has a tendency to increase and it can be reset only after a frame drop. Though frame drops are infrequent, the system is only quasi-stable.

The condition that $m_r \leq \Delta$ does not imply the system will be free from any frame drop. There will be occasional frame drops depending on the statistics of the random sequence $\{\Gamma_n\}$. The catastrophic condition for dropping frames occurs only if $$\frac{1}{(n+1)}\sum_{i=0}^{n} g_i > \left[\Delta + \frac{T - (s_0 - s_n)}{(n+1)}\right].$$

The right hand side of this equation, neglecting implementation noise, can be approximated as $$\left[\Delta + \frac{T}{(n+1)}\right].$$

The left hand side is the sample mean of uncorrelated random time series $\{\Gamma_n\}$ which, by the force of the central limit theorem, has the density function $$f(x) \approx \frac{1}{\sigma\sqrt{2\pi}}\exp\left(-\frac{(x-\eta)^2}{2\sigma^2}\right)$$

where $\eta = m_r$ and $$\sigma^2 = \frac{\sigma_\Gamma^2}{(n+1)}.$$

Hence the probability of dropping a frame at nth frame is approximately given by:

$$\int_{[\Delta + \frac{T}{(n+1)}]}^{\infty} \frac{1}{\sigma\sqrt{2\pi}}\exp\left\{-\frac{(x-\eta)^2}{2\sigma^2}\right\} dx =$$

$$\int_{\frac{[\Delta + \frac{T}{(n+1)}] - m_\Gamma}{\sqrt{\frac{\sigma_\Gamma^2}{(n+1)}}}}^{\infty} \frac{1}{\sqrt{2\pi}}\exp\left\{-\frac{\beta^2}{2}\right\} d\beta = Q\left[\frac{\left[\Delta + \frac{T}{(n+1)}\right] - m_\Gamma}{\sqrt{\frac{\sigma_\Gamma^2}{(n+1)}}}\right]$$

The above expressions are true for any arbitrary density functions. The appearance of the Q(.) function—which is well known in communication systems,—is more than a coincidence.

What is accomplished above is useful in the design process. By the invocation of central limit theorem, we have managed to transform all the unknown statistics of $\{\Gamma_n\}$ into a known Gaussian random process. Hence there is actually no need to know the exact density functions of $\{\Gamma_n\}$. The probability of dropping nth frame with a given set of $\Delta$, T, $m_r$, $\sigma_r$ is given by the above Q(.) function. It is enough to know only mean and variance characterization; different density functions with the same mean and variance would perform identically. Notice that if $\Delta=0$, then the probability of frame drop quickly approaches 0.5. Hence it is critical that $\Delta$ is a non-zero number, preferably much greater than $\delta$ to avoid dropping of frames.

Hence, the frame drop predictor 594 can estimate the value of $\Delta$ in relation to the sync pulses by monitoring arrival times. It can also compute and track the "lost" time as indicated by the above. Hence this predictor 594 can monitor stability and apply control over the display system.

Although the present invention has been particularly described with reference to embodiments thereof, it should be readily apparent to those of ordinary skill in the art that various changes, modifications and substitutes are intended within the form and details thereof, without departing from the spirit and scope of the invention. For example, the present invention can work with many different standards based protocols. Thus, the converted synchronous video signal and the reconstructed video signal can be formatted according to a DVI specification, a HDMI specification, a DisplayPort specification, a SDVO specification, a VGA analog interface through an analog to digital converter, a component video interface through an analog to digital converter a SVIDEO interface through an analog to digital converter, or a COMPOSITE video interface through a video decoder and analog to digital converter.

Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the invention include such changes and modifications.

We claim:

1. A method of providing a video sequence from source with a processing device to a destination with a display device, wherein the destination is remote from the source, comprising the steps of:
at the source, the processing device causing,
converting a synchronous video signal containing a plurality of frames of video data and a plurality of time-based synchronization control signals associated therewith into video data and a header including time-based video signal parameter information using a plurality of sequential packets;
asynchronously transmitting each of the plurality of sequential packets in sequence from the source to the destination with substantially reduced bandwidth through channels with smaller capacity than that normally used for the intended video transmission;
at the destination, the display device causing,
receiving each of the plurality of sequential packets in the sequence;
obtaining a reconstructed synchronous video signal using the time-based video signal parameter information and the video data and a sync pulse generator of the display device to match a frequency of the source, the reconstructed synchronous video signal including substantially visually similar reconstructed video data that is substantially visually similar to the video data and reconstructed vertical and horizontal synchronization control signals that are substantially identical to the plurality of synchronization control signals; and
synchronously outputting the video sequence to a visual monitor of the display device at the predetermined frame rate, the video sequence including the reconstructed synchronous video signal.

2. The method according to claim 1 wherein the transmitting of the plurality of sequential packets through the channel introduces a channel delay time, and wherein a mean value of the channel delay time is less than a frame period associated with the frame rate.

3. The method according to claim 1, wherein the step of converting includes the step of compressing the synchronous video signal using a compression algorithm, and the step of obtaining includes the step of decompressing the packets using a decompression algorithm that corresponds to the compression algorithm.

4. The method according to claim 3 wherein the step of converting introduces numerical values into a predetermined coded header sequence to identify the vertical and horizontal synchronization control signals.

5. The method according to claim 3 wherein the step of obtaining the reconstructed synchronous video signal uses the numerical values in the predetermined coded header sequence to obtain the reconstructed vertical and horizontal synchronization control signals.

6. The method according to claim 1 wherein the step of receiving includes the step of buffering the received packets, and the step of obtaining includes buffering the reconstructed synchronous video signal.

7. The method according to claim 6, wherein the step of buffering the reconstructed synchronous video signal includes the step of toggling the reconstructed synchronous video signal between one of two different buffers, such that one buffer is being emptied by the step of synchronously outputting while the other buffer is being filled by the step of obtaining.

8. The method according to claim 1 wherein the asynchronous video signal has associated therewith a synchronous audio signal, and wherein:
the step of converting converts the synchronous audio signal into audio data and a header including time-based audio signal parameter information;
the step of obtaining obtains a reconstructed audio signal using the time-based audio signal parameter information and the audio data; and
the step of synchronously outputting outputs an audio sequence in synchronism with the video sequence.

9. The method according to claim 1 wherein converted synchronous video signal and the reconstructed video signal are formatted according to a DVI specification.

10. The method according to claim 1 wherein converted synchronous video signal and the reconstructed video signal are formatted according to a HDMI specification.

11. The method according to claim 1 wherein converted synchronous video signal and the reconstructed video signal are formatted according to a DisplayPort specification.

12. The method according to claim 1 wherein converted synchronous video signal and the reconstructed video signal are formatted according to a SDVO specification.

13. The method according to claim 1 wherein converted synchronous video signal and the reconstructed video signal are formatted according to a VGA analog interface through an analog to digital converter.

14. The method according to claim 1 wherein converted synchronous video signal and the reconstructed video signal are formatted according to a component video interface through an analog to digital converter.

15. The method according to claim 1 wherein converted synchronous video signal and the reconstructed video signal are formatted according to a SVIDEO interface through an analog to digital converter.

16. The method according to claim 1 wherein converted synchronous video signal and the reconstructed video signal are formatted according to a COMPOSITE video interface through a video decoder and analog to digital converter.

17. The method according to claim 3 wherein the transmitting of the plurality of sequential packets through the channel introduces a channel delay time, and wherein a mean value of the channel delay time is less than a frame period associated with the frame rate.

18. The method according to claim 3 wherein the step of converting introduces numerical values into a predetermined coded header sequence to identify the vertical and horizontal synchronization control signals.

19. The method according to claim 3 wherein the step of obtaining the reconstructed synchronous video signal uses the numerical values in the predetermined coded header sequence to obtain the reconstructed vertical and horizontal synchronization control signals.

20. The method according to claim 3 wherein the step of receiving includes the step of buffering the received packets, and the step of obtaining includes buffering the reconstructed synchronous video signal.

21. The method according to claim 20, wherein the step of buffering the reconstructed synchronous video signal includes the step of toggling the reconstructed synchronous video signal between one of two different buffers, such that one buffer is being emptied by the step of synchronously outputting while the other buffer is being filled by the step of obtaining.

22. The method according to claim 3 wherein the asynchronous video signal has associated therewith a synchronous audio signal, and wherein:

the step of converting converts the synchronous audio signal into audio data and a header including time-based audio signal parameter information;

the step of obtaining obtains a reconstructed audio signal using the time-based audio signal parameter information and the audio data; and the step of synchronously outputting outputs an audio sequence in synchronism with the video sequence.

23. The method according to claim 1, wherein the step of converting further includes the step of scrambling pixels in order to provide copy protection, and wherein the step of obtaining the reconstructed synchronous video signal includes the step of unscrambling the scrambled pixels.

24. The method according to claim 1 wherein the step of obtaining the reconstructed synchronous video signal alters a retrace percentage.

25. The method according to claim 1 wherein the sync pulse generator inputs a clock signal of a pixel clock of the display device that is adjustable to match the frequency of the source.

26. The method according to claim 1 wherein video synchronization parameters are not embedded into the video data.

27. The method according to claim 1 wherein there are a plurality of destinations each having a separate display device, and each separate display device causes the steps of receiving, obtaining and synchronously outputting.

* * * * *